(12) United States Patent
Chandley

(10) Patent No.: US 7,349,689 B2
(45) Date of Patent: Mar. 25, 2008

(54) COMMUNICATIONS DEVICE PROCESSOR PERIPHERAL

(75) Inventor: Adrian M. Chandley, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 541 days.

(21) Appl. No.: 10/611,123

(22) Filed: Jul. 1, 2003

(65) Prior Publication Data

US 2005/0003761 A1    Jan. 6, 2005

(51) Int. Cl.
 *H04M 3/00* (2006.01)
(52) U.S. Cl. .................. 455/420; 455/41.2; 455/41.3; 345/2.1
(58) Field of Classification Search .............. 455/420, 455/419, 418, 41.2, 41.3, 466, 566, 557, 455/556.1, 556.2; 345/2.1–2.3
See application file for complete search history.

(56) References Cited

U.S. PATENT DOCUMENTS

2002/0015008 A1* 2/2002 Kishida et al. ................ 345/7
2003/0050059 A1* 3/2003 Tsukamoto .................. 455/426
2005/0144259 A1* 6/2005 Buckley et al. ............. 709/219

* cited by examiner

Primary Examiner—Lewis West
(74) Attorney, Agent, or Firm—Woodcock Washburn LLP

(57) ABSTRACT

A communications device, such as a cellphone, functions as a peripheral for a processor, such as a laptop computer. The cellphone and the laptop are directly coupled via a communications link that is not the cellular network. Audio, still images, video data, and/or user interaction options are provided to the cellphone by the laptop via the communications link. The audio data is rendered by the cellphone via the cellphone's speakers or by a headset. The still image or video data is rendered by a display on the cellphone. User interaction prompts are rendered by a display, audio, or tactile feedback on the cellphone. The user input/responses are made through the keypad or other input method (e.g. wheel) and are provided back to the processor. The communications link is a Bluetooth compatible link. Utilizing the cellphone to render video data preserves the life of the batteries in the laptop.

49 Claims, 6 Drawing Sheets

COMMUNICATIONS DEVICE PROCESSOR PERIPHERAL

FIELD OF THE INVENTION

The present invention is generally related to communications devices and processors, and more specifically related to utilizing cellular telephone as a peripheral for a computer processor.

BACKGROUND OF THE INVENTION

Computers, such as personal computers and laptops, are extremely popular. However, the quality of the audio from a personal computer, and especially a laptop, is typically not suitable, or optimized for all potential uses, for example holding a voice conversation. Usually, to hear audio from a computer, one must be in the vicinity of the computer, privacy issues are also a concern in the case of verbal communications, as anyone else in the vicinity of the computer will also hear all sides of the conversation. In the case of a laptop, much of the power supplied by the battery is used to render an image, or simply display status on the large display.

Cellular telephones (cell phones) are extremely popular. It is not uncommon for a person to forsake her land line and use her cell phone as her only communications device. Often, a person may spend considerable time choosing a cell phone. When considering a cell phone, a person may look at the quality of the audio, the quality of the video (if provided), the overall feel of the cell phone, the color, the style, the extras (e.g., headset, chargers), and the service plan for example. People use cell phones during all sorts of occasions, such as while commuting to work, while eating, while walking, while working, while playing, just to name a few. Thus, it is understandable how a person can become quite comfortable with her cell phone.

In the case of a personal computer, or a laptop, the ability to hold a voice conversation using the inbuilt audio system and assembly is not usually given much consideration. Other factors are considered higher priority for most users, for example, performance, memory, disk capacity and display resolution. For high quality personal communications, it is generally the case that a purpose specific peripheral is required (e.g. use of a PC Audio Headset).

There is a desire therefore, to use a purpose optimized communications device, such as a cellular telephone as a peripheral for a processor, thus providing the ability to render audio, still images and video as well as user interaction provided by the processor via the communications device, allowing the user to choose a single device such as a cellular handset for its intended purpose, as well as for use as a PC peripheral requiring similar attributes.

SUMMARY OF THE INVENTION

A system and method in accordance with the present invention utilizes a communications device, such as a cellular telephone for example, as a peripheral for a processor, such as a personal computer (PC) or laptop. The communications device and the processor communicate via a communications link which provides direct communications. That is the communications device and the processor communicate with each other without having to communicate through any intervening systems. The communications device is capable of communicating with other communications devices independent of the processor and the communications link. For example, if the communications device is a cellular telephone, the cellular telephone can communicate with other cellular telephones independent of the processor and the communications link, and can communicate directly with the processor without using the cellular network. The communications link can be a wired or wireless link (e.g., a Bluetooth link). The communications device renders data received from the processor via the communication link, such as audio and/or video data.

BRIEF DESCRIPTION OF THE DRAWINGS

The features and advantages of the present invention will be best understood when considering the following description in conjunction with the accompanying drawings, of which.

DETAILED DESCRIPTION OF ILLUSTRATIVE EMBODIMENTS

A system in accordance with the present invention comprises a communications device, such as a cellular telephone for example, functioning as a peripheral to a processor, such as a laptop or personal computer (PC), for example. In this processor-centric system, the communications device replaces the speaker, microphone, and/or display of the processor. The communications device is directly coupled to the processor. For example, if the communications device is a cellular telephone, it is not coupled to the processor via a cellular network, but rather is coupled directly to the processor, by any of several exemplary communications links described below. Various embodiments are described herein. These various embodiments include the communications device functioning as a voice peripheral, an audio peripheral, a display peripheral, and combinations thereof. Embodiments also include the communications link between the communications device and the processor comprising a wireless link, a wired link, an optical link, and combinations thereof. Further embodiments include the communications device coupled to other entities (e.g., the Internet) via the processor. User interaction with the processor can be accomplished via the communications device. For example, a user can navigate a play list, change setting on the processor, or send text messages via the communications device. These actions can be accomplished by a keypad and/or wheel (e.g., thumbwheel) on the communications device.

This processor-centric system provides the ability for the processor to run applications and transmit information related to the applications to the communications device. For example, the processor can perform a multimedia application such as playing a movie (e.g., stored on internal memory or from a compact disk (CD)). The movie is transmitted to the communications peripheral, which in turn, renders the movie. Rendering the movie on the communications device in this manner provides many benefits. For example, if the processor is a laptop running on a battery pack, the life of the battery pack can be extended because the processor does not have to use its display to render the movie. In another scenario, several users can watch separate movies on their respective communications devices (e.g., cell phones). The separate movies are transmitted by the processor (e.g., laptop), which is capable of running several application concurrently. This scenario is especially advantageous on airplanes, and the like.

Figure 1:
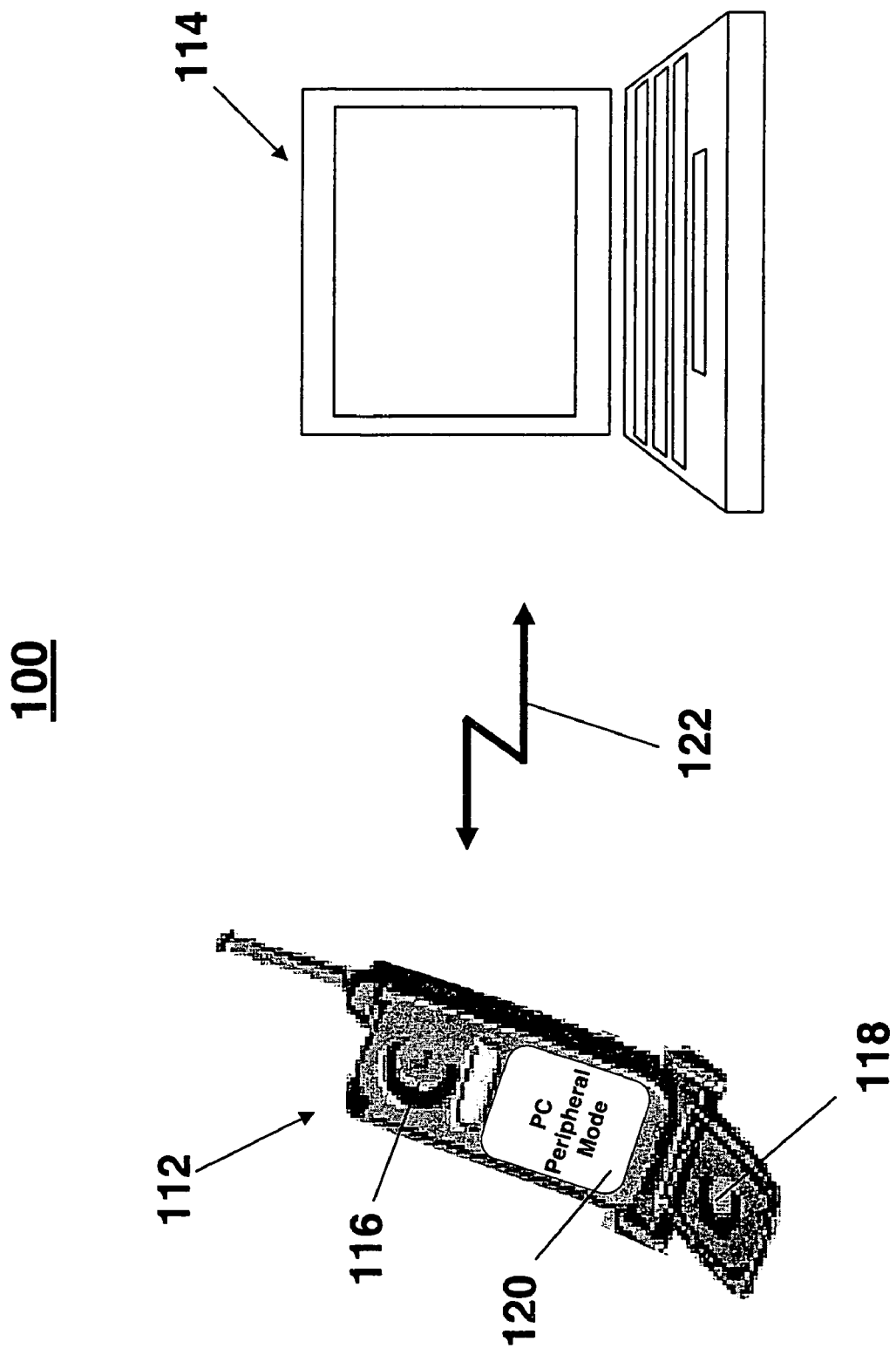
FIG. 1 is an illustration of a processor-centric system comprising a peripheral communications device and a processor in accordance with the present invention.

FIG. 1 is an illustration of a processor-centric system 100 comprising a peripheral communications device 112 and a processor 114. Although the communications device 112 is depicted as a cellular telephone in FIG. 1, it is to be understood that the communications device 112 can be any appropriate communications device. Examples of an appropriate communications device include a cellular telephone, a portable phone, a personal digital assistant (PDA), a Smart Personal Object, and a portable or stationary electronic communications device. Although the processor 114 is depicted as a laptop computer in FIG. 1, it is to be understood that the processor 114 can be any appropriate processor. Examples of an appropriate processor include a laptop computer, a notebook computer, a PC, a server, a desktop computer, a mobile computer, and a handheld computer. The communications device 112 comprises a speaker 116 for rendering acoustic information, and a microphone 118 for receiving acoustic information.

The communications device 112 optionally comprises a display 120 for rendering visual information. The communications link 122 facilitates the transfer of information (also referred to as data) between the communications device 112 and the processor 114. The communications link 122 comprises a transmitter and receiver on the communications device 122 and a transmitter and receiver on the processor 114.

Figure 6:
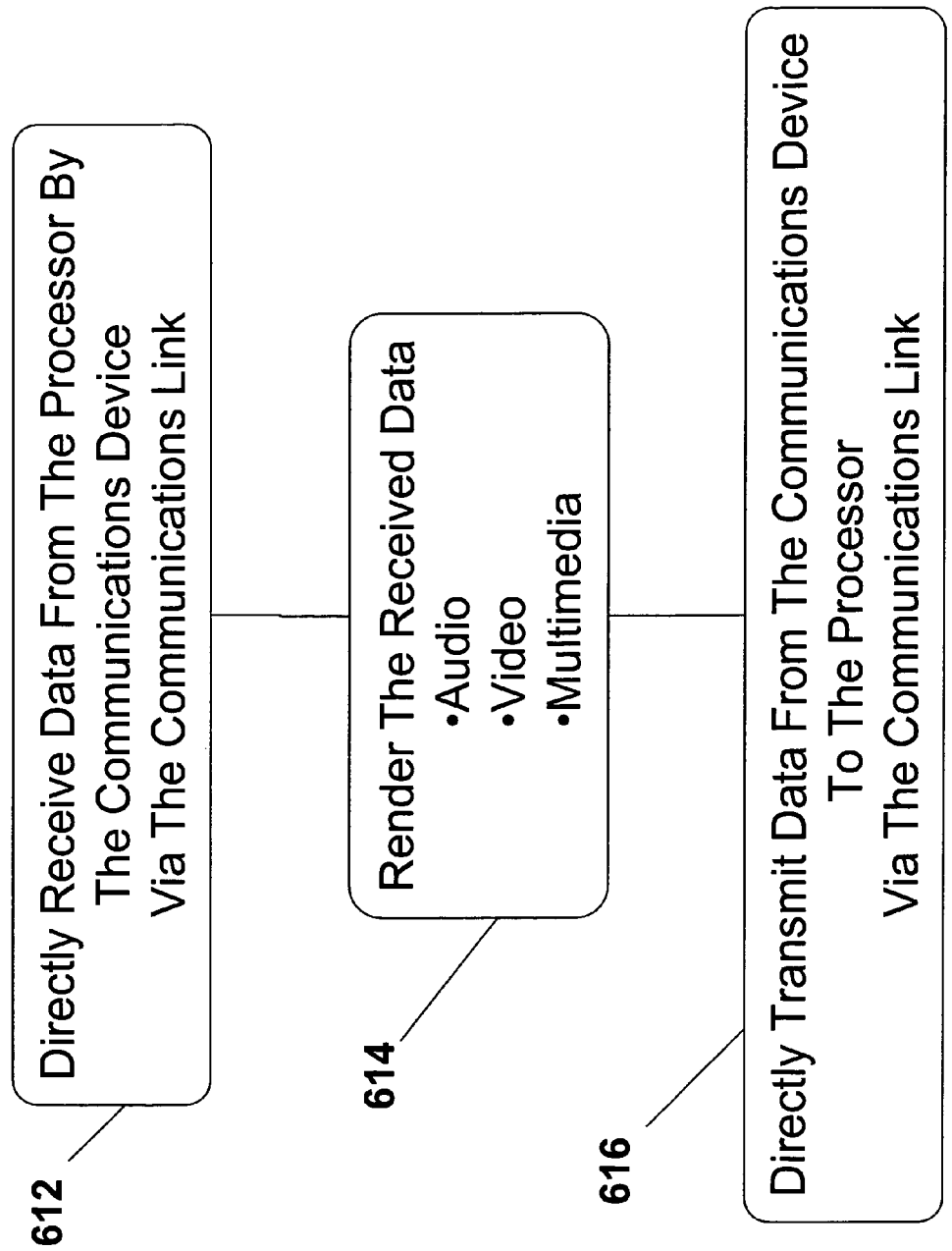
FIG. 6 is a flow diagram of an exemplary process for rendering data from a processor with a communications device in accordance with the present invention.

Note that the receivers and transmitter for the communications device 112 and the processor 114 are not shown in FIG. 1 for the sake of clarity, however these transmitters and receivers are depicted in FIG. 6. The communications link 122 can comprise any appropriate communications link. Examples of an appropriate communications link include a wireless link, a radio frequency (RF) link, a Bluetooth link, a wired link, a Universal Serial Buss (USB) link, an optical link, and an infrared link. In one embodiment of the invention, the communications device 112 is configured to a peripheral mode. The peripheral mode allows the communications device 112 to be able to receive and transmit information from and to the processor 114. The peripheral mode can be activated from the communications device 112, from the processor 114, or a combination thereof.

In one embodiment of the system 100, the communications device 112 functions as the speaker and microphone for the processor 114. Thus the audio data provided by the processor 114 is transmitted to the communications device 112 via the communications link 122 and rendered by the speaker 116. Also, acoustic information (e.g., voice) provided to the communications device 112 via the microphone 118 is transmitted to the processor 114 via the communications link 122. Optionally, video data provided by the processor 114 is transmitted to the communications device 112 via the communications link 122 and rendered by the display 120.

Figure 2:
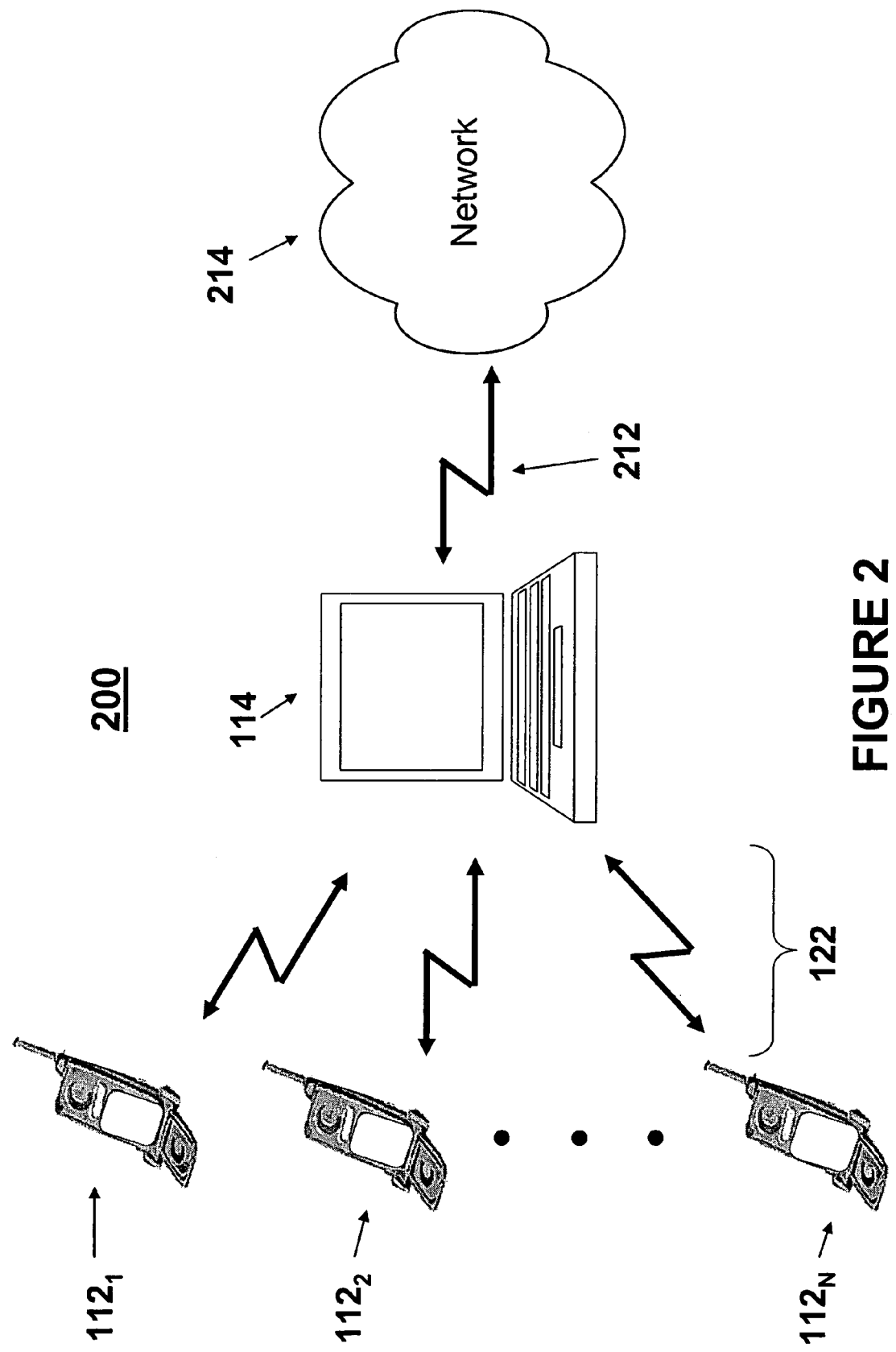
FIG. 2 is an illustration of a processor-centric system comprising a plurality of communications devices coupled to a processor via a communications link, wherein the processor is also coupled to a network via a network link, in accordance with the present invention.

FIG. 2 is an illustration of a processor-centric system 200 comprising a plurality of communications devices $112_1$-$112_N$ coupled to a processor 114 via a communications link 122, wherein the processor 114 is also coupled to a network 214 via a network link 212, in accordance with an embodiment of the present invention. The network 214 can comprise any appropriate network, such as an intranet, a telephone network, or the internet, for example. The network link 212 can comprise any appropriate link capable of transferring data between the processor 114 and the network 214. Examples of an appropriate network link 212 includes a wired link, a wireless link, an optical link, a Transmission Control Protocol/Internet Protocol (TCP/IP) compatible link, or a combination thereof. Each communications device $112_1$ through $112_N$ function as a true peripheral, thus the system 200 is a processor-centric system. Each communications device 112 is controlled by the processor 114. For example, assume the processor 114 is coupled to a land line telephone system and configured to receive calls coming in from the land line. The processor 114 routes the call to selected ones of the communications devices $112_1$-$112_N$.

In another example, the processor 114 is coupled to the Internet and configured to receive voice communications via voice over internet protocol (VOIP). The processor 114, upon receiving a VOIP call, routes this call to selected ones of the communications devices $112_1$-$112_N$ via the direct communications link 122. Note that the communications device 112 does not initiate the call. Also note that the routing of a call to a communications device 112 via the direct communications link 122 is not simply a download from the internet to a cellular telephone via a cellular network. The routing is controlled by the processor 114, and bypasses the cellular network.

As described above, the communications link 122 can comprise any appropriate communications link capable of directly transferring information (data) between the communications device 112 and the processor 114. In one embodiment of the invention, the communications link 112 comprises a Bluetooth communications link. Bluetooth is known in the art as a low power multi-channel RF communications standard. Utilizing a Bluetooth communication link 122, the processor 114 can concurrently communicate with selected communications device peripherals $112_1$-$112_N$ without interference. Thus, for example, users of the system 200 can each listen to music over their respective communications device 112 which is being provided by the processor 114 via the communications link 122. All the users can listen to the same music, or each user can listen to her particular choice of music. The processor 114 is capable of processing several applications currently. Thus the processor 114 is capable of processing several music applications concurrently. Utilizing a multi-channel embodiment of the communication link 122, each user can listen to selected music. The wireless feature of this embodiment of the communications link 122 allows the users to be mobile (e.g., all users do not have to sit in the same room).

Figure 3:
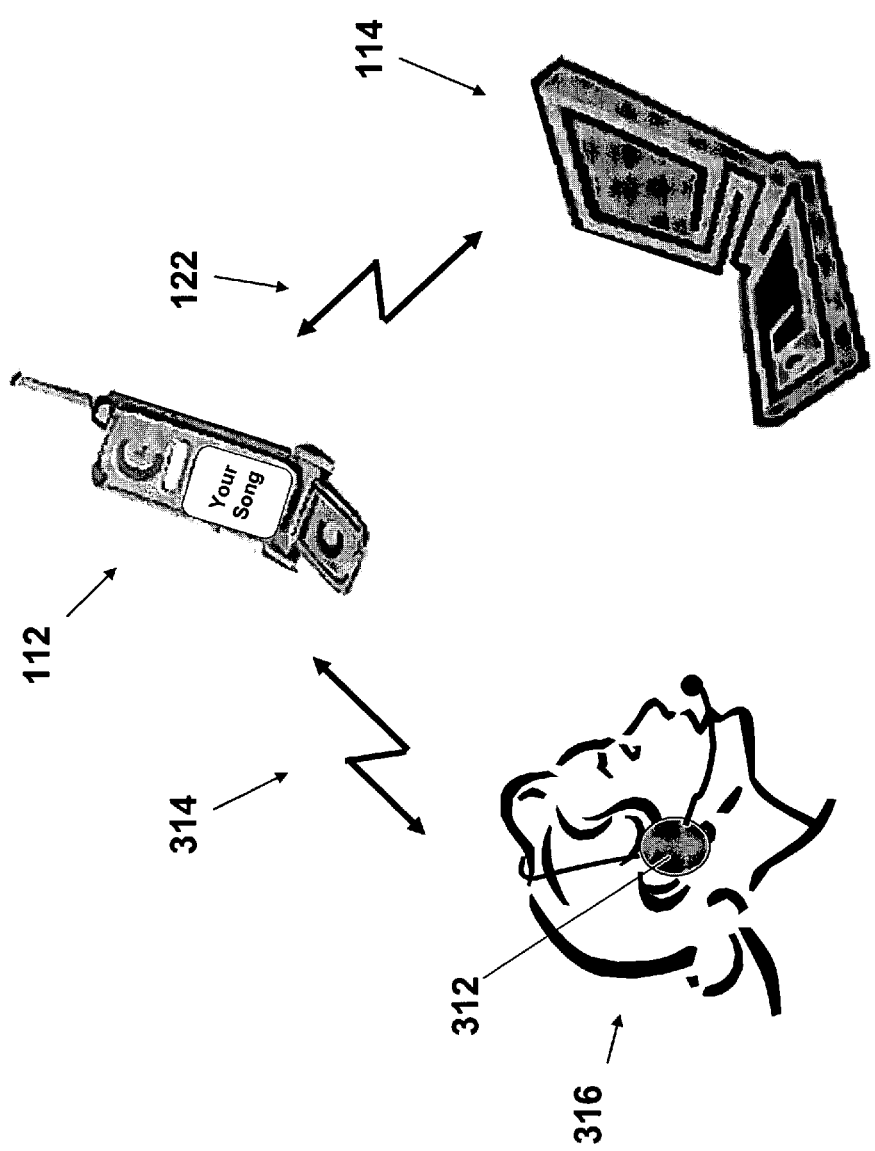
FIG. 3 is an illustration of an exemplary communications device comprising a headset in accordance with the present invention.

FIG. 3 is an illustration of a communications device 112 comprising a headset 312. In an embodiment of the present invention, the communications device 112 comprises a headset 312 which, when in use, is coupled to the communications device via communications link 314. The use of the headset 312 allows a user 316 to listen to data (e.g., music or voice) provided by the communications device 112 via the communication link 314. This advantageously allows the user free use of her hands. In one exemplary embodiment of the invention, the user 316 can listen to music while at the same time, utilizing the processor 114. In this exemplary embodiment, the processor plays the music (e.g., via a media player application), transmits data related to the music via the communications link 122, which is received from the communications device 112 and transmitted to the headset 312 via the communications link 314.

The communications link 314 can be any appropriate link such as a wireless link, a radio frequency (RF) link, a Bluetooth link, a wired link, a Universal Serial Buss (USB) link, an optical link, and an infrared link. In one embodiment of the invention, the link 314 is a Bluetooth compatible link. In another exemplary embodiment of the invention, the processor 114 is coupled to the internet, and the user 316 can concurrently play a group participation game with another person via the internet and talk to that person via the communications device 112.

Figure 4:
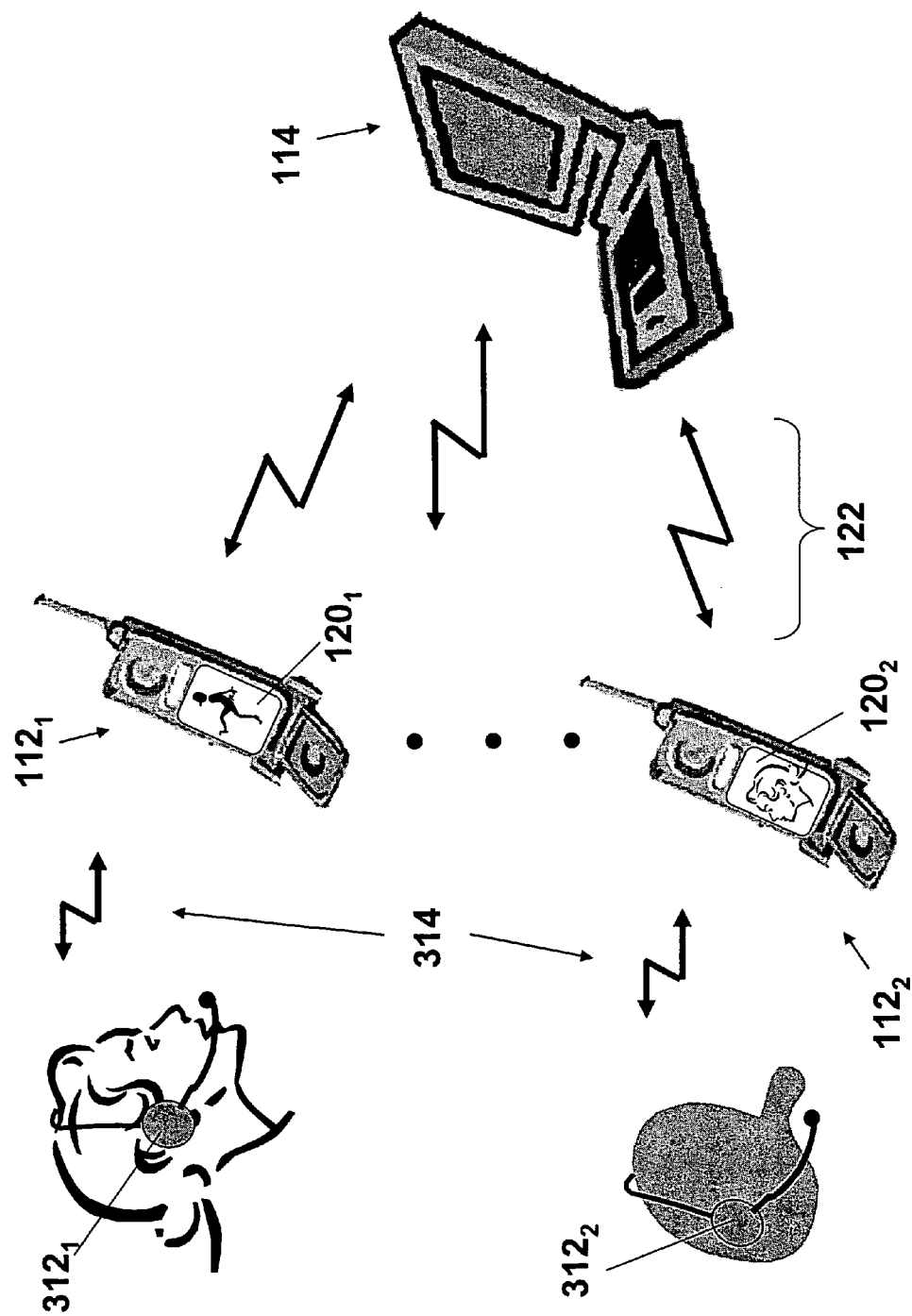
FIG. 4 is an illustration of exemplary multiple communications devices concurrently receiving different information from the processor via communications link in accordance with the present invention.

FIG. 4 is an illustration of multiple communications devices $122_1$, $112_2$ concurrently receiving different information from the processor 114 via communications link 122. The users depicted in FIG. 4 are watching video information being rendered by displays $120_1$ and $120_2$ of the communications devices $112_1$ and $112_2$, respectively. The users are concurrently listening to audio information being rendered by headsets $312_1$ and $312_2$. Thus, audio and video information is transferred via communications link 122 from the processor 114 to the communications devices $112_1$ and $112_2$. The communications devices $112_1$ and $112_2$ render the video information via displays $120_1$ and $120_2$, respectively, and transmit audio information via the communications link 314 to respective headsets $312_1$ and $312_2$.

In another embodiment of the invention, the headset 312 comprises a microphone for receiving acoustic information and transmitting that information to the communications device 112 via the communications link 314. This embodiment is particularly advantageous in scenarios involving multiple users who are out of earshot (not within audible range) of each other. For example, assume two users (husband and wife) are on an airplane and are not sitting near each other. Also assume that the processor is a laptop computer, the communications devices are cellular telephones having headsets, and the communications links 122 and 314 are Bluetooth compatible links. Utilizing this embodiment of the invention, each user can concurrently watch a different movie. That is the laptop computer 114 can be instructed to play two selected movies (stored within the laptop) and transmit the information related to each movie over separate channels of the Bluetooth link 122. Each cellular telephone 112 can be configured to a peripheral mode. The peripheral mode allows the cellular telephone 112 to be able to receive and transmit information from and to the laptop 114. The video and audio information for each move is transmitted via the Bluetooth communications link 122 to the respective cellular telephones. That is, the husband's selected movie information is transmitted to his cell phone and the wife's selected movie information is transmitted to her cell phone. Each user watches the video portion of the respective movie on the display 120 of his or her cellular telephone 112. Each user also listens to the audio portion of the respective movie on his or her headset 312. If the wife wants to talk to the husband, for example, she can simply speak into the microphone on her headset 312 (or she could activate this feature via a switch, for example. The microphone receives her voice and transmits information related to her voice to her cellular telephone 112 via the Bluetooth link 314. Her cellular telephone 112 then transmits that information to the laptop computer 114 via the Bluetooth link 122. The laptop computer 114 then transmits the information to the husband's cellular telephone via the Bluetooth link 122. In another embodiment, the wife can send a text message, or the like, to her husband.

Figure 5:
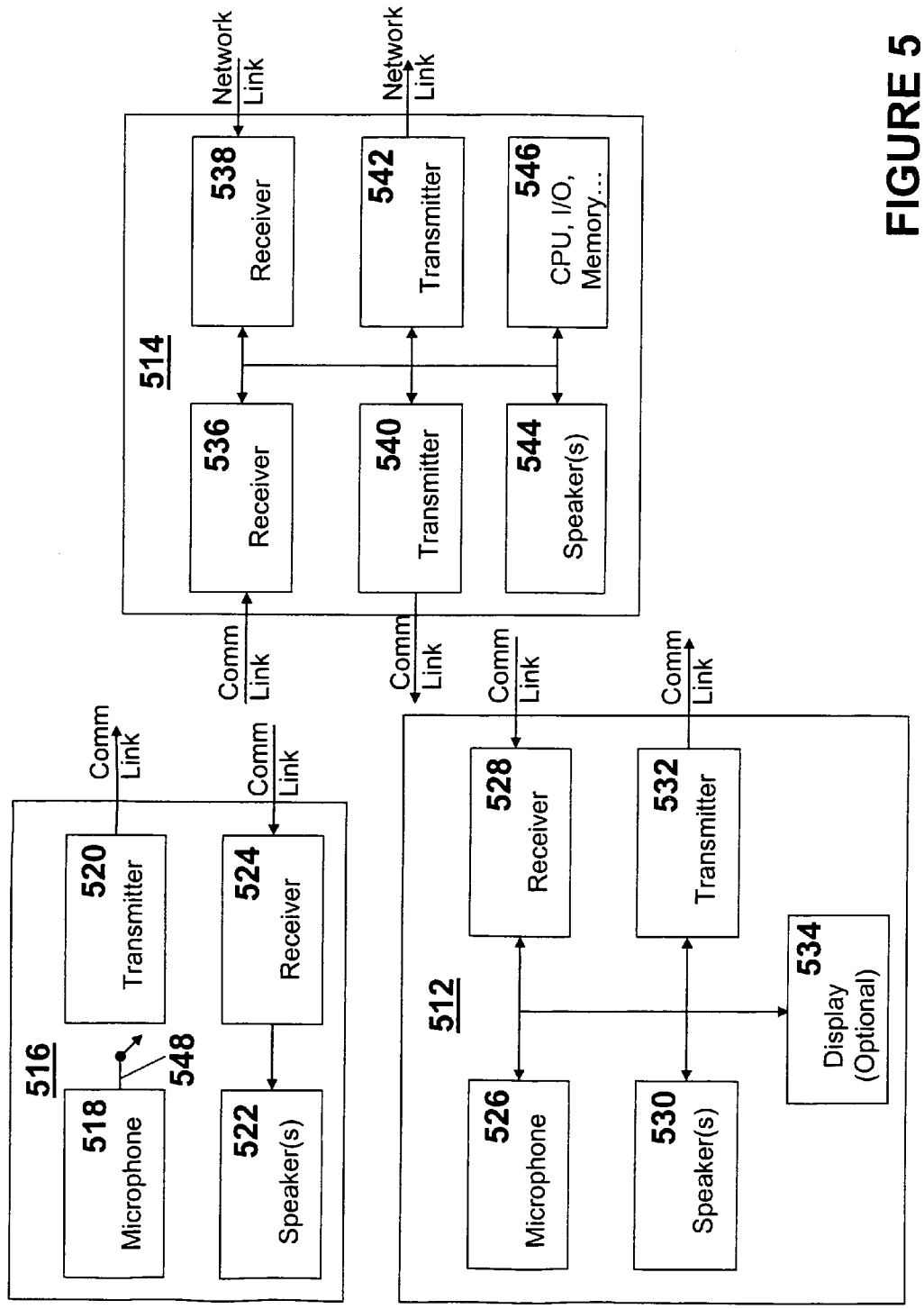
FIG. 5 is block diagram of an exemplary system for utilizing a communications device as a peripheral for a processor, in accordance with the present invention.

FIG. 5 is block diagram of a system 500 for utilizing a communications device 112 as a peripheral for a processor 114, in accordance with an exemplary embodiment of the present invention. The system 500 comprises a communications device 112, a processor 114, and optionally a headset 312. The communications device 512 comprises a microphone 526, a receiver 528, at least one speaker 530, a transmitter 532, and an optional display 534. The speaker(s) 530 and the display 534 are transducers for rendering audio information and video information, respectively, received from the processor 514 via the communications link. The receiver 528 receives data via the communications link. As described above, the communications link can be a link to the headset 516, to the processor 514, or a combination thereof. The receiver 528 provides the portion of the received data related to audio information to the speaker(s) 530. The speaker(s) 530 converts the received data into acoustic energy (renders the audio). The receiver 528 provides the portion of the received data related to video information to the display 534 (if a display is utilized). The display 534 converts the received data to video information (renders the video) and provides audio portion of that data to the microphone 526. The transmitter 532 provides data to the communications link. The transmitter 532 receives data related to acoustic information from the microphone 526. This data is transferred to the headset 516, the processor 514, or a combination thereof.

The optional headset 516 comprises a microphone 518, a transmitter 520, at least one speaker 522, and a receiver 524. The receiver 524 receives data via the communications link. As described above the communications link is a link to the communications device 512. The receiver 524 provides the received data to the speaker(s) 522. The speaker(s) 52 converts the received data into acoustic energy (renders the audio). The transmitter 520 provides data to the communications link. The transmitter 520 receives data from the microphone 518. This data is transferred to the communications device 512. Optionally, the headset comprises a switch 548 for allowing transmission of data from the microphone 518 to the transmitter 520. The switch 548 can be mechanically operated, voice activated, or a combination thereof.

The processor 514 comprises a receiver 536 and a transmitter 540 coupled to the communications link. As described above, the communications link can is a link to the communications device 512. The processor 514 also comprises a receiver 538 and a transmitter 542 coupled to a network link. As described above, the network link can be coupled to a network (e.g., the internet). The receiver 536 receives data via the communications link. As described above, the communications link is a link to the communications device 512. The receiver 536 provides the received data to the processing portion 546 of the processor 514. The transmitter 540 provides data to the communications link. The transmitter 540 data is related to acoustic information, video information, or a combination thereof. In an embodiment of the invention, control signals are transferred between the communications device 512 and the processor 514 via the communications link to configure the communications device 512 in and out of the peripheral mode. Note, in the exemplary embodiment wherein the communications device 516 is a cellular telephone, the communication link is not a cellular network, but rather is a direct communications link between the communications device 512 and the processor 514.

FIG. 6 is a flow diagram of an exemplary process for rendering data from a processor with a communications device in accordance with the present invention. At step 612, data transmitted by the processor (e.g., processor 114) is directly received by the communications device (e.g., communications device 112) via the communications link (e.g., communications link 122). Data can also be received by an auxiliary peripheral (e.g., headset 312) at step 612. Data received by the communications device is rendered by the communications device at step 614. As described above, audio data is rendered by an acoustic transducer (e.g., speaker(s) 116), and video data is rendered by a display device (e.g., display 120), if the communications device has a display device. Audio data can also be rendered by the auxiliary peripheral (e.g., headset 312) at step 614. Data can be directly transmitted from the communications device to the processor via the communications link at step 616. For example, the communications can be transmitted data indicative of voice information and/or control information to the processor. Data can also be transmitted by the auxiliary peripheral (e.g., headset 312) at step 616.

A method for rendering data from a processor with a communications device as described herein may be embodied in the form of computer-implemented processes and system for practicing those processes. A method for rendering data from a processor with a communications device as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes a system for practicing the invention. The methods for rendering data from a processor with a communications device as described herein may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes a system for practicing the invention. When implemented on a general-purpose processor, the computer program code segments configure the processor to create specific logic circuits.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While embodiments of the present invention have been described in connection with the illustrative embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed:

1. A system for using a communications device as a peripheral for a processor, said system comprising:
    said communications device, wherein said communications device is configured to:
        directly receive data from said processor via a communications link;
        render said received data; and
        directly transmit data to said processor via said communications link; and
    said communications device is configured to communicate with a plurality of communications devices independent of said processor and said communication link; and
    said processor, wherein:
        said processor is independent of and separate from said communications device;
        said processor is directly coupled to said communications device via said communications link and
        said processor is configured to concurrently process a plurality of applications and concurrently transmit data associated with each of said plurality of applications, respectively, to selected ones of said plurality of communications devices; and
        each of said selected ones of said plurality of communications devices is configured to render data received from said processor.

2. A system in accordance with claim 1, wherein transmission of data to said communications device by said processor is initiated by said processor.

3. A system in accordance with claim 1, wherein said communications device comprises a voice communications device.

4. A system in accordance with claim 1, wherein said communications device comprises a cellular telephone.

5. A system in accordance with claim 1, wherein said communications link is a wired communications link.

6. A system in accordance with claim 1, wherein said communications link is a wireless communications link.

7. A system in accordance with claim 1, said communications link is compatible with a Bluetooth communications standard.

8. A system in accordance with claim 1, wherein said communications link comprises an optical link.

9. A system in accordance with claim 1, wherein said communications link comprises a radio frequency (RF) link.

10. A system in accordance with claim 1, wherein said communications link is compliant with a universal serial bus (USB) standard.

11. A system in accordance with claim 1, wherein said data received by said communications device from said processor is indicative of audio information.

12. A system in accordance with claim 1, wherein said data received by said communications device from said processor is indicative of video information.

13. A system in accordance with claim 1, wherein said data received by said communications device from said processor is indicative of multimedia information.

14. A system in accordance with claim 1, wherein said data transmitted by said communications device is indicative of a user interaction.

15. A system in accordance with claim 1, wherein said data transmitted by said communications device is indicative of a message.

16. A system in accordance with claim 1, wherein:
said processor is coupled to a network via a network link; and
said communications device is capable of communicating with said network via said processor.

17. A system in accordance with claim 16, wherein said network link is compatible with a Transmission Control Protocol/Internet Protocol (TCP/IP).

18. A system in accordance with claim 1, further comprising a headset comprising a microphone and at least one speaker, wherein:
said headset is coupled to said communications device;
said headset is capable of:
receiving data indicative of audio information from said communications device and rendering said audio information via said at least one speaker; and
receiving audio information via said microphone and transmitting data indicative of said microphone audio information to said communications device.

19. A system in accordance with claim 1, wherein said plurality of applications comprises a plurality of multimedia sessions and each of said selected ones of said plurality of communications devices renders received multimedia data.

20. A system in accordance with claim 1, said communications device comprising:
a communications device receiver for directly receiving data from said processor via said communication link; and
a communications device transmitter for directly transmitting data to said processor.

21. A system in accordance with claim 1, wherein said communications device is configured in a peripheral mode for functioning as a peripheral of said processor.

22. A system in accordance with claim 21, wherein said peripheral mode is activated and deactivated by at least one of said communications device and said processor.

23. A communications device processor peripheral comprising:
a receiver for directly receiving data from a processor via a communications link; and
a transmitter for directly transmitting data to said processor via said communications link; wherein:
said communications device is configured to communicate with a plurality of communications devices independent of said processor and said communication link; and
at least one transducer for rendering data received from said processor, wherein:
said processor is processing configured to concurrently process a plurality of applications and concurrently transmit data associated with each of said plurality of applications, respectively, to selected ones of said plurality of communications devices; and
each of said selected ones of said plurality of communications devices is configured to render data received from said processor.

24. A communications device in accordance with claim 23, wherein said communications device is configured in a peripheral mode for functioning as a peripheral of said processor.

25. A communications device in accordance with claim 24, wherein said peripheral mode is activated and deactivated by at least one of said communications device and said processor.

26. A communications device in accordance with claim 23, wherein said communications device comprises a voice communications device.

27. A communications device in accordance with claim 23, wherein said communications device comprises a cellular telephone.

28. A communications device in accordance with claim 23, wherein said communications link is a wired communications link.

29. A communications device in accordance with claim 23, wherein said communications link is a wireless communications link.

30. A communications device in accordance with claim 23, said communications link is compatible with a Bluetooth communications standard.

31. A communications device in accordance with claim 23, wherein said communications link comprises an optical link.

32. A communications device in accordance with claim 23, wherein said communications link comprises a radio frequency (RF) link.

33. A communications device in accordance with claim 23, wherein said communications link is compliant with a universal serial bus (USB) standard.

34. A communications device in accordance with claim 23, wherein said data received by said communications device from said processor is indicative of audio information.

35. A communications device in accordance with claim 23, wherein said data received by said communications device from said processor is indicative of video information.

36. A communications device in accordance with claim 23, wherein said data received by said communications device from said processor is indicative of multimedia information.

37. A communications device in accordance with claim 23, wherein:
said communications device is coupled to a headset; and
said headset is capable of:
receiving data indicative of audio information from said communications device and rendering said audio information via at least one speaker; and
receiving audio information via a microphone and transmitting data indicative of said microphone audio information to said communications device.

38. A method for rendering data from a processor with a communications device, said method comprising:
directly receiving data via a communications link by said communications device from said processor, wherein said data is indicative of at least one of audio information and video information; and
rendering at least one of said audio information and said video information with said communications device, wherein said communications device is configured to communicate with a plurality of communications devices independent of said processor and said communication link, wherein:
said processor is configured to concurrently process a plurality of applications and concurrently transmit data associated with each of said plurality of applications, respectively, to selected ones of said plurality of communications devices; and
each of said selected ones of said plurality of communications devices is capable of rendering data received from said processor.

39. A method in accordance with claim 38, wherein said communications device is configured in a peripheral mode for performing said acts of receiving and rendering.

40. A method in accordance with claim 39, wherein said peripheral mode is activated and deactivated by at least one of said communications device and said processor.

41. A method in accordance with claim 38, wherein said communications device comprises a voice communications device.

42. A method in accordance with claim 38, wherein said communications device comprises a cellular telephone.

43. A method in accordance with claim 38, wherein said communications link is at least one of a wired communications link, a wireless communications link, a Bluetooth compatible link, an optical link, a radio frequency (RF) link, and a universal serial bus (USB) compatible link.

44. A computer-readable medium encoded with computer program code for directing a computer processor to render data from a processor with a communications device, said program code comprising:
a receive code segment for causing said computer processor to directly receive data via a communications link by said communications device from said processor, wherein said data is indicative of at least one of audio information and video information; and
a render code segment for causing said computer processor to render at least one of said audio information and said video information with said communications device, wherein:
said communications device is configured to communicate with a plurality of communications devices independent of said processor and said communication link;
said processor is configured to process a plurality of applications and concurrently transmit data associated with each of said plurality of applications, respectively, to selected ones of said plurality of communications devices; and
each of said selected ones of said plurality of communications devices is configured to render data received from said processor.

45. A computer-readable medium in accordance with claim 44, wherein said communications device is configured in a peripheral mode for performing said acts of receiving and rendering.

46. A computer-readable medium in accordance with claim 45, wherein said peripheral mode is activated and deactivated by at least one of said communications device and said processor.

47. A computer-readable medium in accordance with claim 44, wherein said communications device comprises a voice communications device.

48. A computer-readable medium in accordance with claim 44, wherein said communications device comprises a cellular telephone.

49. A computer-readable medium in accordance with claim 44, wherein said communications link is at least one of a wired communications link, a wireless communications link, a Bluetooth compatible link, an optical link, a radio frequency (RF) link, and a universal serial bus (USB) compatible link.

* * * * *